Dec. 3, 1968     L. MARCOUX     3,414,705

COMPONENT OVEN

Filed Oct. 24, 1965     6 Sheets-Sheet 1

Inventor,
Leo Marcoux,
by
Att'y.

Inventor,
Leo Marcoux,

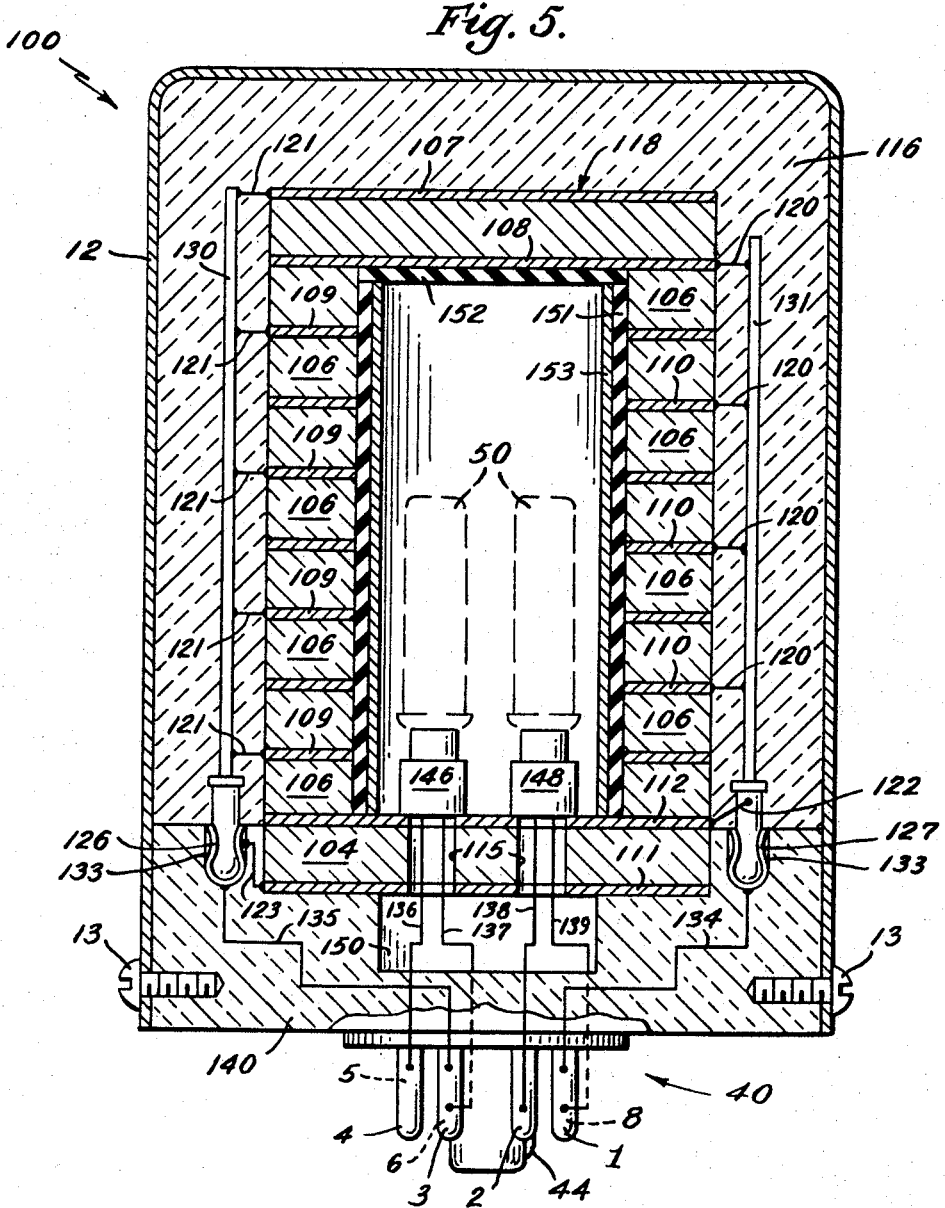

Dec. 3, 1968 L. MARCOUX 3,414,705
COMPONENT OVEN
Filed Oct. 24, 1965 6 Sheets-Sheet 4

Inventor,
Leo Marcoux,
by John A. Haug Att'y.

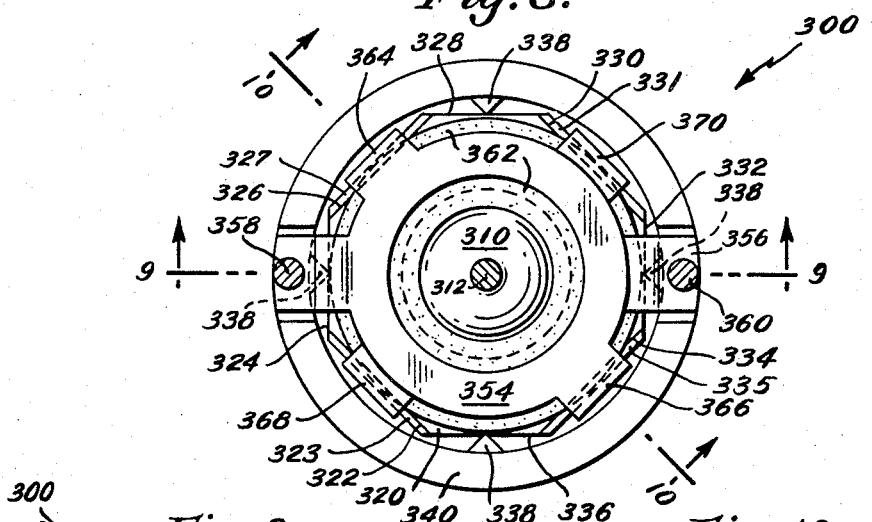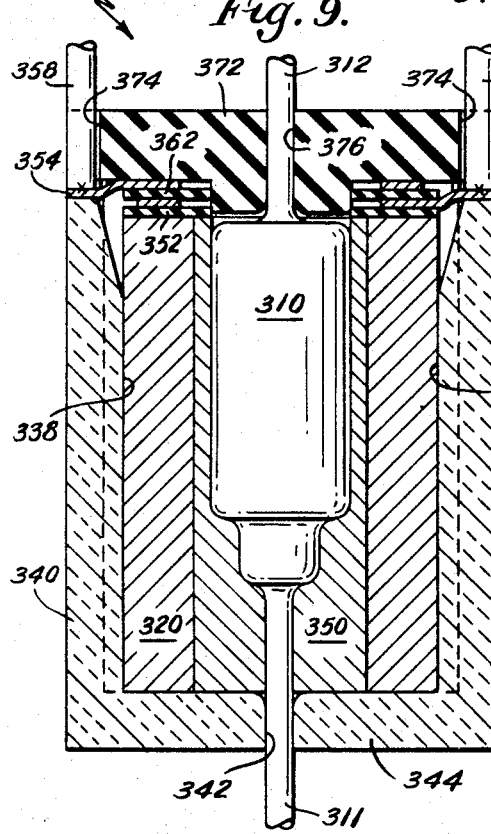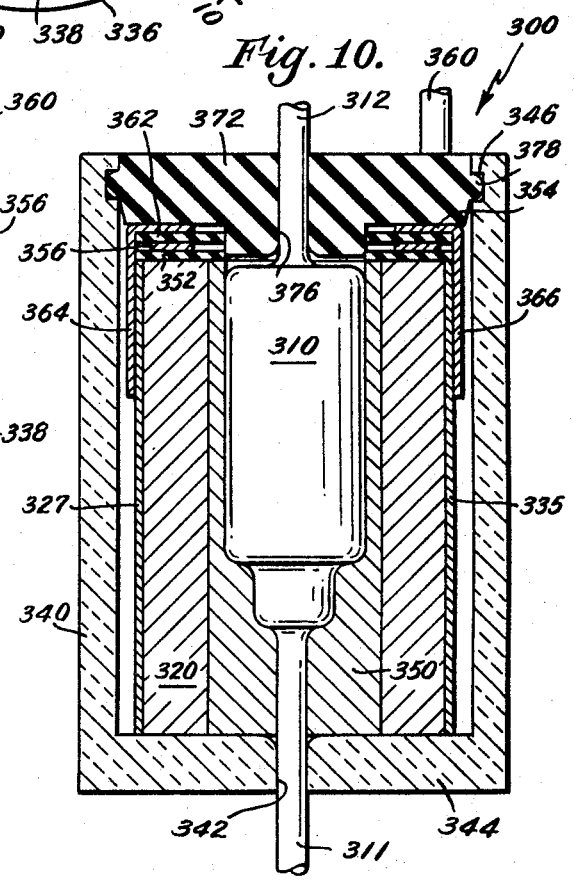

Dec. 3, 1968   L. MARCOUX   3,414,705
COMPONENT OVEN
Filed Oct. 24, 1965   6 Sheets-Sheet 6

Inventor,
Leo Marcoux,
by  John L. Haug  Att'y.

United States Patent Office
3,414,705
Patented Dec. 3, 1968

1

3,414,705
COMPONENT OVEN
Leo Marcoux, Pawtucket, R.I., assignor to Texas Instruments Incorporated, Dallas, Tex., a corporation of Delaware
Continuation-in-part of application Ser. No. 435,166, Feb. 25, 1965. This application Oct. 24, 1965, Ser. No. 508,643
23 Claims. (Cl. 219—210)

ABSTRACT OF THE DISCLOSURE

Method and means for providing a relatively constant ambient for temperature sensitive devices is disclosed. The method includes the steps of forming an enclosure, in which the controlled ambient will be effected, at least partially of a positive temperature coefficient of resistance (hereinafter referred to as PTC) material and applying a voltage to the PTC material. The material acts as a heater and also as its own temperature regulator. The enclosure is formed, at least partially, by various structures or means including a single hollow cylindrical element, a stack of annular discs and two or more pieces of PTC material. Another embodiment discloses a design particularly useful with transistor-type devices while yet another is particularly useful with diode-type devices.

Several materials are disclosed which exhibit a PTC characteristic.

This is a continuation-in-part of Ser. No. 435,166, filed Feb. 25, 1965, now abandoned.

This invention relates to heating elements, and particularly to ovens used to provide a constant temperature for temperature sensitive devices located therein. Thre are many electronic components which must be contained in a constant ambient for effective operation in certain applications. Examples of such components are crystals, diodes, transistors and so on.

It is known to provide ovens as described above which utilize a heater and a thermostat. The termostat keeps the inside oven temperature within a certain range by turning on and off the heater current by use of movable contacts. This type of oven has certain inherent disadvantages, viz., the temperature varies as a result of the characteristics of the thermostat—from a maximum to a minimum back to a maximum and so on. Also, since there is mechanical movement, the longevity of the device is limited.

Another approach has been what is commonly known as proportional control whereby relatively complex electrical circuits serve to limit the power input to the heater to equal the heat loss from the oven. This is done, for example, by providing a bridge containing a temperature-sensing device which is used to balance a circuit containing the heater. This type of control eliminates the on/off moving contacts and therefore provides more precise temperature control with no overshoot or thermal cycling, more constant power requirement and no noise due to mechanical operation although many devices of this description do emit electrical noise. Also, the device is relatively complex and expensive.

It is another object of the invention to provide an is simple, highly reliable, inexpensive, long lasting, of

2 minimal size, mechanically and electrically silent operating, relatively insensitive to voltage variations and displays a closely controlled, relatively constant oven temperature.

It is an object of the invention to provide a heating element which has a self-regulated temperature.

It is a further object to provide an oven which is characterized by being of a self-regulating and self-limiting temperature nature.

It is still another object of the invention to provide an oven which will maintain a relatively constant inside temperature for temperature-sensitive devices contained therein regardless of change in heat demand which is simple, reliable, long lasting, silent operating, and has no moving parts.

It is another object of the invention to provide a component oven which employs solid state control with no moving parts.

The invention accordingly comprises the elements and combinations of elements, steps and sequence of steps, features of construction and manipulation of arrangements of parts, all of which will be exemplified in the structures and methods hereinafter described, and the scope of the application of which will be indicated in the following claims.

In the accompanying drawings, in which several of the various possible embodiments of the invention are illustrated:

FIG. 5 is a vertical partial cross section through a second embodiment of the invention;

FIG. 8 is a plan view of a fourth embodiment of the invention with the cover removed;

FIG. 9 is a vertical cross section taken along line 9—9 of FIG. 8;

FIG. 10 is a vertical cross section taken along line 10—10 of FIG. 8; and

Similar reference characters indicate corresponding parts throughout the several views of the drawings.

Figure 1:
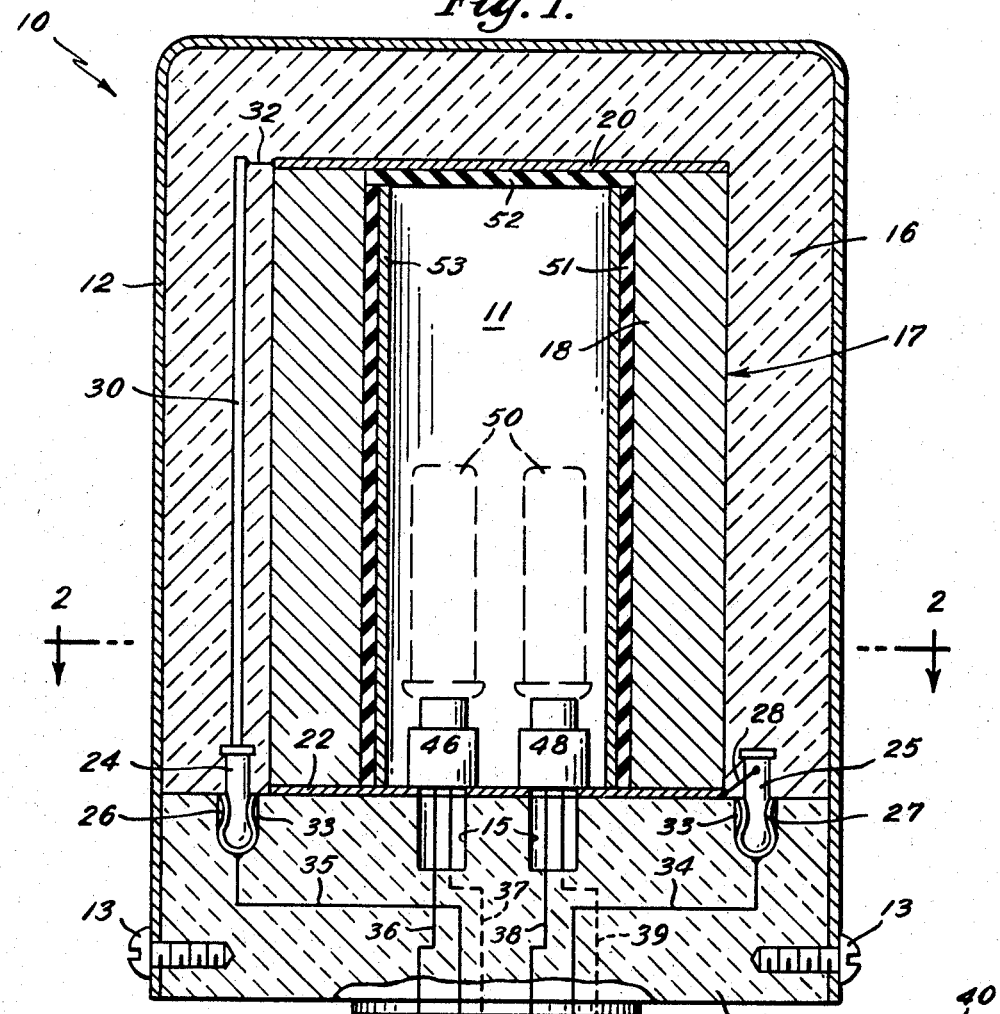
FIG. 1 is a vertical partial cross section through one embodiment of the invention.

Dimensions of certain of the parts as shown in the drawings may have been modified and/or exaggerated for the purposes of clarity of illustration.

Figure 2:
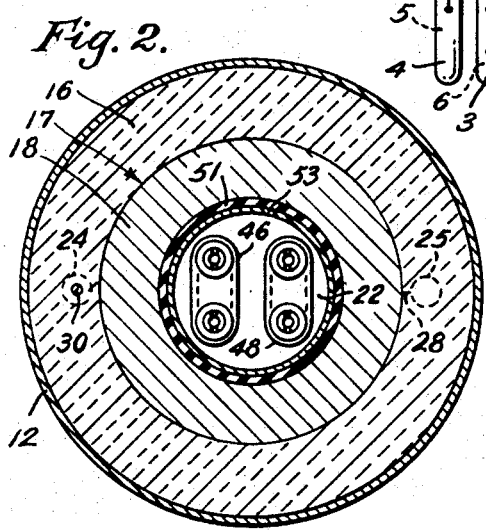
FIG. 2 is a cross section along 2—2 of FIG. 1.
Figure 3:
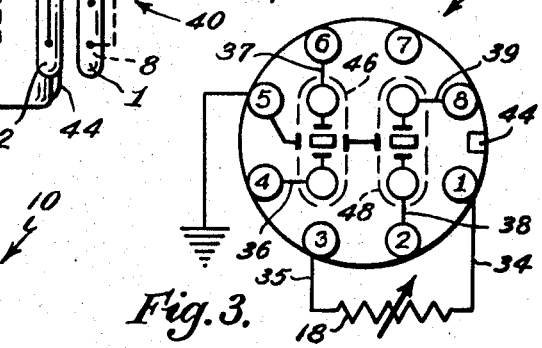
FIG. 3 is a schematic wiring diagram of the embodiments of FIGS. 1 and 5.

Referring now to FIGS. 1-3, the first embodiment is shown as a single PTC element oven or chamber 10 which comprises a disc-shaped base 14 which may be formed of a conventional moldable phenolic resin or other suitable electrical insulation material, which mounts a cylindrically-shaped element 18 made of a steep sloped PTC material such as, for example, $Ba_{.997}LA_{.003}TiO_3$. The cylinder forms a cavity 11 in which the components are mounted as explained infra. Layers 20 and 22 of silver or other conductive material are attached to the ends of cylinder 18 by any known process such as firing or ultrasonic soldering. This provides a good electrical connection with the PTC element 18. A metal liner 53 may be placed in the oven cavity 11 which serves to even-out any temperature gradients. Electrical insulation 51 and 52 are used to prevent any short circuiting of the heater current. Conductors 30 and 32 connect layer 20 to a quick-disconnect pin 24 and conductor 28 connects layer 22 to quick-disconnect pin 25. Pins 24 and 25 are mounted in a conventional potting compound 16 which is of an electrical as well as a heat insulation material conventional in the art. The insulation 16 will keep heat losses of the oven to a minimum. The pins 24 and 25 protrude from potting material 16 as shown in FIG. 1 and are received in mating clips 26 and 27 respectively. The clips 26 and 27 are contained in bores 33 formed in base 14. A conventional mounting assembly 40 is attached to the bottom of the base 14 which includes shank 42 formed with key 44 which serves to properly orientate the oven for insertion in a reeciving means (not shown). The mounting assembly 40 mounts pins 1–8. FIG. 3 shows a schematic wiring diagram indicating the internal electrical connections of pins 1–8. Conductor 34 joins pin 1 to clip 27 and hence the bottom of PTC element 18 via pin 25, conductor 28 and layer 22. Conductor 35 joins pin 3 to clip 26 and hence the top of PTC element 18 via pin 24, conductors 30 and 32 and layer 20. The components 50 (crystals, diodes, etc.) which are to be mounted in the oven cavity 11 are mounted in supports or sockets 46 and 48 (the number of supports or sockets provided is optional, two are shown for convenience). Pins 4 and 6 of the mounting assembly 40 are connected to socket 46 by conductors 36 and 37 respectively. Pins 2 and 8 are connected to socket 48 by conductors 38 and 39 respectively. Pin 5 is grounded and pin 7 is not used. Metal cap 13 encloses the oven 10 and is attached to base 14 by any conventional means, such as screws 13.

Heating and regulating current (ac or dc) is applied through the PTC element 18 from pin 1 to conductors 34, clip 27, pin 25, conductor 28, layer 22, through PTC element 18, layer 20, conductors 32 and 30, pin 24, clip 26, conductor 35 to pin 3. Element 18 acts as a heater and also as its own temperature regulator. The current passing through the PTC material causes heat to be generated thereby heating the oven cavity 11. Once the oven is warmed up, it is noted that very little temperature variation occurs within the cavity 11 regardless of ambient temperature fluctuations outside the oven, i.e., changes in heat demand, or appreciable fluctuations in the applied voltage. A relatively constant ambient is provided in the oven for the components contained therein and this is achieved without moving parts and without any elaborate, comparatively complex circuitry. The relatively low heat generation of components within the oven has been found to have a negligible effect in the inside temperature of the oven.

For the successful operation of the oven within the purview of the invention, the self-regulating heating element 18 must be constructed of material having as a characteristic a large positive temperature coefficient of resistance (PTC); that is, material in which the percent change in resistance per degree change in temperature in the so-called break-point range (about 230° F. on the curve of FIG. 4) is very large as an example 150% per degree centigrade. This break-point range occurs near the Curie or transition point of the material and is sometimes referred to as the PTC anomaly.

Figure 4:
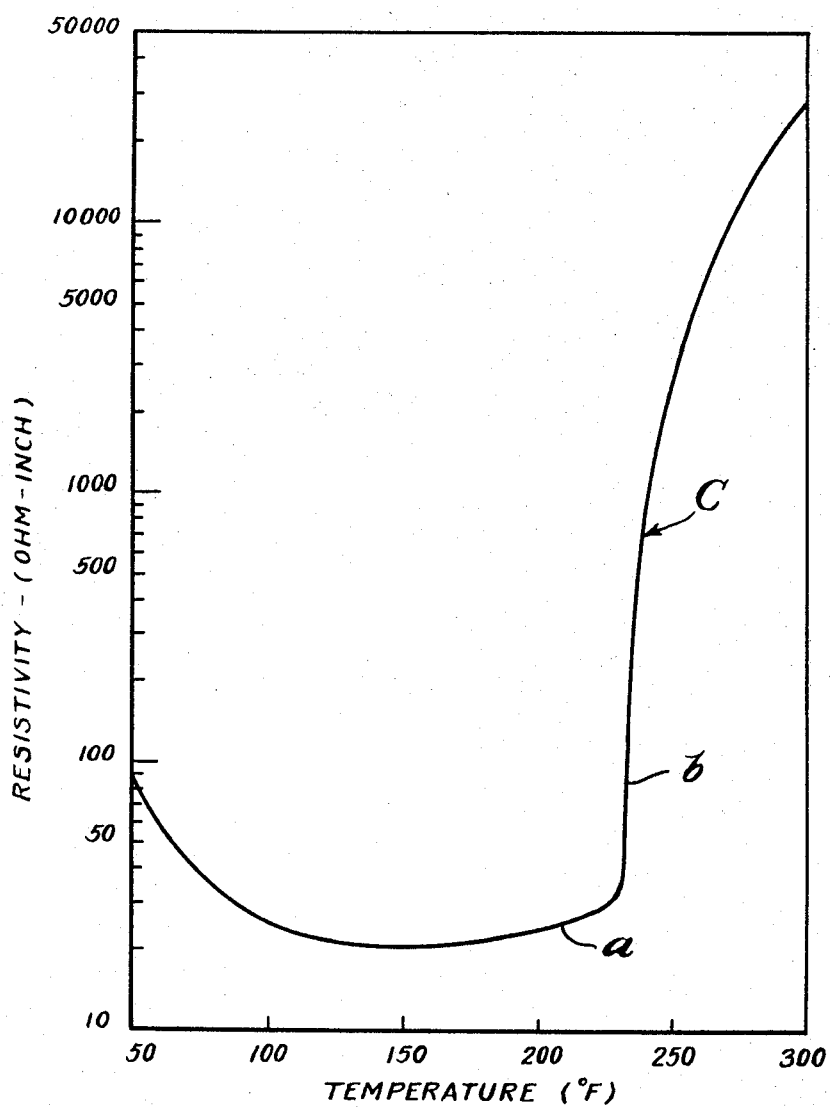
FIG. 4 is a chart plotting logarithms of resistivity against temperature of a steep sloped PTC material usable in accordance with the invention.

FIG. 4 shows the resistivity-temperature curve C of such a material. While I do not wish to be bound by any particular theory as to why the oven operates as it does, a possible explanation is as follows: At temperatures above the anomaly near point $b$ on curve C very little heating occurs since resistivity increases much more rapidly than temperature at temperatures above the anomaly. Therefore, heat generation, which is inversely proportional to resistivity, drops off drastically above the anomaly. Heat transferred through regions of relatively high temperature such as portions of element 18 radially removed from the surface 17, is accordingly low with the result that the temperature gradient is also low. When the temperature in a region becomes depressed below the anomaly, section $a$ of curve C, say by a reduction of temperature along surface 17, the resulting drop in resistivity causes a greatly increased current flow and attendent rate of heat generation in that region along the surface and thus a sharply increased gradient in those adjoining regions that must conduct the heat away. As the surface temperature is depressed further, the anomaly temperature moves radially inward toward the longitudinal cylindrical axis creating regions of high heat generation as it passes through. Those regions at temperatures above the anomaly continue to generate heat at approximately the same low rate and thus their temperatures are hardly affected by such change in surface temperature.

In the embodiment of FIG. 1, the greater part of the heat flow is perpendicular to the current flow. The heat flows radially in element 18 while the current flows axially. If the outside temperature decreases, i.e., heat demand is increased, thereby reducing temperature of the outer surface 17, the resistivity of that same area will also be reduced. This will cause an increase in current at the surface 17, however, current throughout the main body of the element 18 will remain fairly constant. Heat generation at the surface will increase, this will tend to offset the temperature reduction induced by increased heat demand. Hence, the element will generate heat at the surface 17 where it is most useful.

The oven inherently operates in the range which includes the anomaly point, this is approximately 230° F. on the curve shown in FIG. 4. The material, which temperature-resistivity curve is shown, is lanthanum doped barium titanate, the preparation of which is described infra. Ordinarily, the barium titanate family of ceramics has an electrical resistivity of a magnitude greater than $10^{12}$ ohm cm., however proper doping can reduce the resistivity to less than $10^2$ ohm cm. Lanthanum doping of barium titanate produces an exceptionally steep slope of the resistivity-temperature curve at temperatures above the anomaly point combined with a relatively low base resistivity at temperatures below the anomaly point. Other doping elements may be used to modify the anomaly temperature, the base resistivity and the rate of change of resistivity with temperature above the anomaly temperature.

As an example, one self-regulating heater element 18 was made using $Ba_{.997} La_{.003} TiO_3$ as follows.

The raw materials used were reagent grades of barium carbonate ($BaCO_3$), lanthanum carbonate $La_2(CO_3)_3$: $5H_2O$ and titanium dioxide ($TiO_2$). These were weighed out to an accuracy of about ±.25% to form stoichiometric mixtures, plus 0.1 mole percent excess $TiO_2$ in order to assure the formation of a liquid phase during final firing. These materials were mixed and a sufficient amount of distilled water was added to form a 20% solid mixture by weight. This mixture was ball milled and dried. The dried product was powdered and calcined in order to convert the material into the desired doped compound ($Ba_{.997} La_{.003} TiO_3$) by firing at approximately 1100° C. in air and cooled. The material, in the form of a porous cake, similar in texture and appearance to soft blackboard chalk, was broken up and wet milled as above, dried comminuted and sieved from ±40 to −270 (U.S. standard sieves). The resulting powder was again immediately dried to drive off any moisture which might have been absorbed during comminution and sieving and finally pressed into the desired cylindrical shape using conventionally closed die ceramic-pressing techniques on a hydraulic press. The resulting compacted powder body was fired to the ceramic state at about 1500° C. Further details regarding the preparation of similar PTC material may be found in copending application, filed Apr. 13, 1964, Ser. No. 359,370, assigned to the assignee of the instant invention.

Any material which displays a relatively steep positive sloped resistivity-temperature curve can be used as the heat generating-self regulating element in accordance with the present invention such as the carbon black filled crosslinked polyethylene disclosed in copending applications of Francis Buiting and Joseph Waseleski, Jr., Ser. No. 472,108, filed July 15, 1965, and assigned to the assignee of this invention.

FIG. 5 shows another embodiment of the invention. It is important to achieve a homogeneous heater element of constant density so that the resistivity is consistent, i.e., internal cracks or non-conducting inclusions must be avoided. The oven in FIG. 5 lends itself to the achievement of such uniformity by employing a stacked disc configuration. The only difference between oven 10 of FIG. 1 and oven 100 of FIG. 5 is the form of the PTC heater-regulator element and electrical connection thereof. The description of the remainder of the device will, therefore, not be repeated.

The heater-self regulator assembly 118 is composed of a plurality of annular discs 106, the number of which is a matter of choice but shown in FIG. 5 as eight, are sandwiched between discs 102 and 104. These discs are made of PTC material having the same characteristic of a steep-positive slope resistivity-temperature curve at temperatures above the anomaly point as that material used in cylinder 18. A conductive layer is attached by conventional means to the faces of each of these discs, the layers shown in FIG. 5 numbered from 107–112. The even-numbered layers 108–110 are electrically connected to conductor 131 by conductors 120. Conductor 131 is connected to pin 125. Layer 112 is electrically connected to pin 125 by conductor 122. Odd-numbered layers 107–109 are connected to conductor 130 by conductor 121. Conductor 130 is electrically connected to quick-disconnect pin 124. Bottom layers 111 is connected to clip 126 by conductor 123. It may be seen that this provides a stack of discs, electrically connected in parallel and that the greater part of the heat flow is radial and therefore perpendicular to the current flow. This will provide even better temperature control than element 18 because it will minimize the effects of any localized areas of non-uniform density and hence will make resistivity more consistent throughout the stacked assembly 118.

Bottom disc 104 is provided with bores 115 to provide space for conductors 136, 137 and 138, 139 which lead to sockets 146, 148 respectively. Cavity 150 may be provided in base 140, if desired, to give still more room for the conductors. Conductors 134 and 135 connect clips 127 and 126 to pins 1 and 3 to complete the electrical connections in the same manner as described supra in reference to conductors 34, 35 in FIG. 1.

Instead of employing conductive layers metal tabs may be inserted between the PTC discs to provide the electrical connections therefore. It should be noted that separate voltage sources could be supplied to the several discs of equal or varying magnitude to provide a desired axial temperature gradient if desired.

Figure 7:
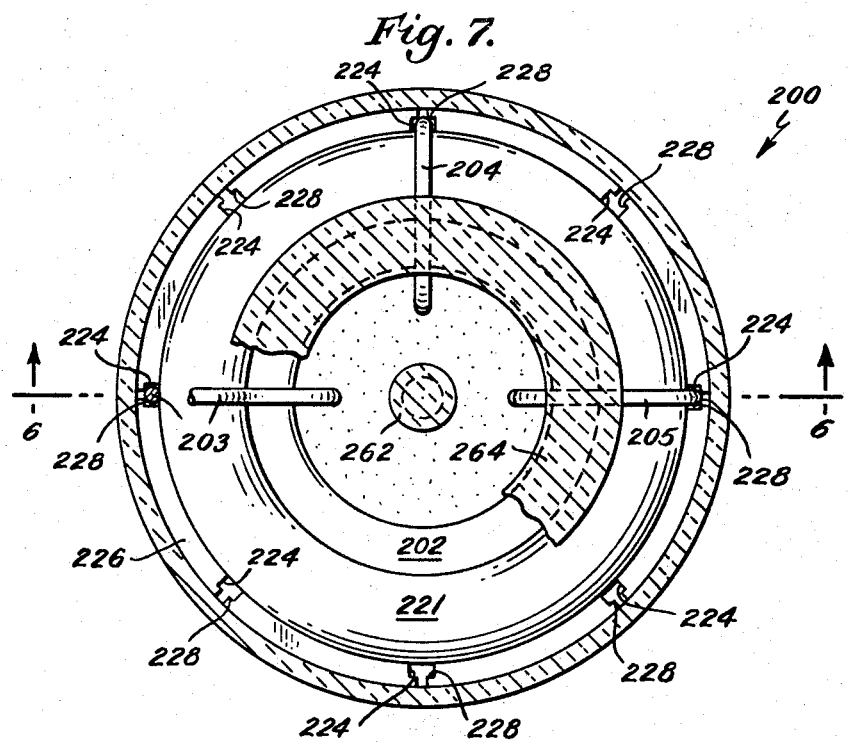
FIG. 7 is a cross section along line 7—7 of FIG. 6 with parts broken away for clarity.
Figure 6:
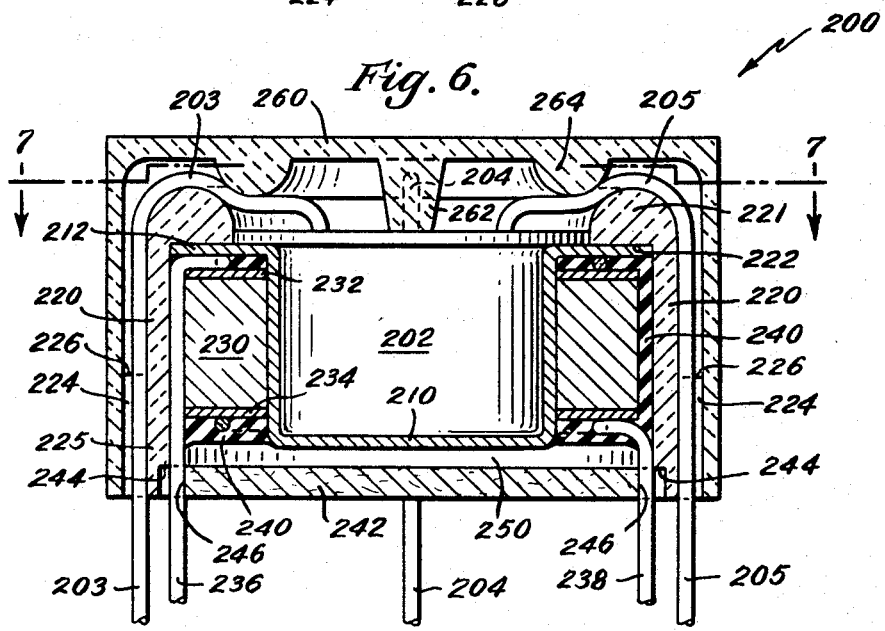
FIG. 6 is a vertical cross section through a third embodiment of the invention taken on line 6—6 of FIG. 7.

In FIGS. 6 and 7 is shown an oven 200 which is particularly useful with transistors. Transistor 202 is shown with three leads 203, 204 and 205, although it is obvious that any number of leads would come within the purview of this invention. Transistor 202 is telescopically received in mounting can 210. Can 210 is formed with an annular flange 212 of a good thermal conductor such as aluminum. An electrical insulation layer is provided on the outer surface of can 210. Although this may be done in various ways, such as by coating with a thermoplastic resin, heat conduction should be kept at an optimum level. Employing anodized aluminum meets the above requirements. Flange 212 of can 210 abutts shoulder 222 formed in tubular casing member 220 of a thermally and electrically insulating material, such as a thermoplastic (e.g. nylon). End 225 of casing 220 has an annular flange 226 in which are formed slots 224. Transistor leads 203, 204 and 205 are located in slots 224 and are retained therein by shoulders 228. These slots are shown to be rectangular in shape but could be any other convenient shape, such as eliptical. The PTC heater regulator element 230 is ring-shaped and fits closely around can 210. Layers 232 and 234 of silver or other conductive material serve as terminal surfaces on opposite faces of element 230. Leads 236 and 238 are electrically connected as by soldering, to layers 232, 234 respectively. The leads, as shown, contact the layers throughout approximately 360° thereby insuring uniform electrical conductivity through element 230. Electrically and thermally insulating potting compound 240 of a conventional type is infilled around element 230. Shoulder 244 is formed in end portion 225 of casing 220 which seats disc 242, formed of an electrical insulating material such as a resin impregnated fiberboard. Disc 242 is provided with slots 246 to provide access for PTC heater leads 236 and 238. Shoulder 244 is positioned to provide a predetermined air gap 250 between disc 242 and can 210 and potting material 240 thereby resulting in a desired thermal insulation. Instead of relying on air gap 250 some other thermal insulation could be used.

A cover member 260 is positioned closely around casing 220 and can be formed of the same electrically, thermally insulating material as the casing, i.e. nylon. Cover 260 is provided with projection 262 which serves as a component wedge to maintain transistor 202 firmly in mounting can 210. Annular projection or wedge 264 in cover 260 contact leads 203, 204 and 205 biasing them against hub 221 of casing 220. This construction serves to minimize heat loss through leads 203, 204 and 205. That is, it decreases the effective size of the heat sink of the transistor leads. The transistor 202 is in close thermal relation to heater 230 resulting in more efficient control. It has been found useful to apply a coating of a heat transfer compound to the outer periphery of mounting can 210, such as a silicon compound. This facilitates heat conductance from the PTC element 230 through mounting can 210 to transistor 202. One such compound available is GE G641 Insulgrease. A coating of this heat transfer compound may also be applied to the outer periphery of transistor 202, further facilitating heat conductance from the PTC heater.

It will be noted that in this embodiment and in the ones described infra the component is in intimate thermal contact with the PTC heater-regulator element.

Oven 300, which is particularly useful for diodes and the like, is shown in FIGS. 8–10. A diode 310 is shown positioned in oven 300 and has two leads 311 and 312 which extend therefrom through the walls of the oven. Oven 300 comprises a hollow tubular-shaped PTC heater element 320. Element 320 as shown is octagonal in cross section, although it is obvious that the number of faces provided is a matter of choice, providing rectangular faces 322, 324, 326, 328, 330, 332, 334 and 336. Layers 323, 327, 331 and 335 of silver or other conductive material are attached in a conventional manner to faces 322, 326, 330 and 334 respectively. Thus, alternate faces are electrically conductive. Ribs 338 are provided in casing 340 and serve to center PTC element by contacting the non-electrical conducting faces 324, 328, 332 and 336. Casing 340 is generally cylindrical in shape and composed of an electrically and thermally insulating material such as a thermoplastic resin. An aperture 342 is provided in bottom wall 344 of the casing to permit passage of lead 311. Diode seating member 350 is telescopically received in the bore of PTC element 320 and fits closely therein. Member 350 is constructed of a good thermally conducting but electrically insulating material, such as anodized aluminum. Before inserting diode 310 in seating member 350 a coating of heat transfer compound may be applied to the outer periphery of diode 310 and member 350. As explained supra, this serves to facilitate heat conductance from the PTC heater element 320 through seating member 350 to the diode 310 and avoids hot spots and the like. An electrically insulating washer 352 overlies the outer end of PTC element 320 and also retains member 350 within casing 340. Terminal members 354 and 356 are welded to leads 358 and 360 as best seen in FIG. 9 and are separated by electrically insulating terminal separator 362. Terminal member 354 is provided with two downwardly depending fingers 364, 366 which are in good electrical contact as by soldering with layers 237 and 335 respectively, as best seen in FIG. 10. Terminal member 356 is provided with downwardly depending fingers 368 and 370 which are in good electrical contact as by soldering with layers 323 and 331 respectively.

The terminal members and associated washers are covered by cap 372 which is provided with slots 374 in which leads 358, 360 are located and aperture 376 through which diode lead 312 extends. Cap 372 is also constructed of electrically and thermally insulating material, e.g. nylon, and is provided with an annular rib 378 which is received in a mating groove 346 in casing 340.

Figure 11:
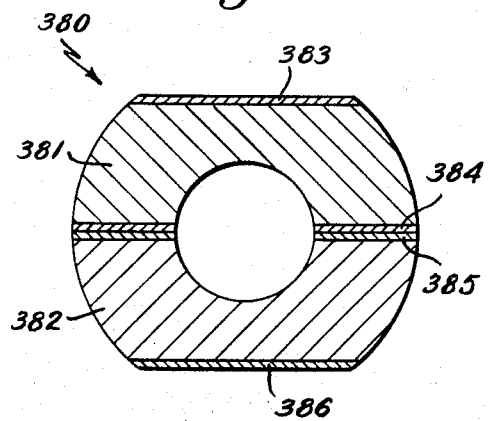
FIGS. 11 and 12 are cross sections of two alternate heating elements usable in the FIG. 8-10 embodiment.
Figure 12:
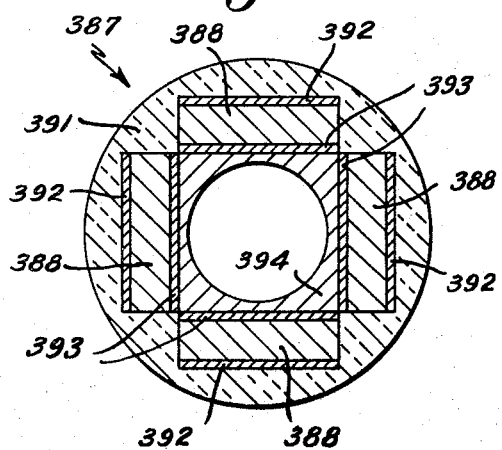

FIGS. 11 and 12 are cross sections of two other PTC heating elements which can be used in place of element 320.

Referring first to FIG. 11, PTC element 380 is composed of two halves 381, 382. Electrically conductive layers 383 and 384 are attached in a conventional manner to opposite faces of half 381 while layers 385 and 386 are attached to opposite faces of half 382. Lead 358 is electrically connected to layers 383 and 386 while lead 360 is electrically connected to layers 384, 385. It will be seen that current will pass from the outer layers 383, 386 through the PTC halves 381, 382 to layers 384, 385 thereby causing the element 380 to generate heat in accordance with the present invention.

FIG. 12 shows another PTC heater assembly 386 useful in the diode oven of FIGS. 8–10. Assembly 387 is composed of a plurality of PTC slabs 388 enclosed by electrically and thermally insulating member 391. The PTC slabs 388 have outer electrically conductive layers 392 and inner electrically conductive layers 393 conventionally attached respectively thereto. Diode seating member 394 retains the slabs in place and is constructed of material which is thermally conductive but electrically insulating, similar to member 350, e.g. anodized aluminum. A silicone heat transfer compound may be applied to the outer surfaces of element 394 to enhance the thermal conductivity from the heating PTC slabs 388. Lead 358 is electrically attached to outer layers 392 and lead 360 is electrically attached to inner layers 393 to effect a passage of current from the outer layers 392 to the inner layers 393.

It will thus be seen that the embodiments of the present invention offer numerous advantages over the prior art. Among them are for example low cost; minimal size; solid state control with no moving parts; self-regulation using no moving contacts, sensing circuits, amplification circuits, etc.; extreme simplicity; and ease of fabrication.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. Also, it is to be understood that the phraseology or terminology employed herein is for the purpose of description and not of limitation.

I claim:

1. The method of providing a relatively constant temperature in an enclosure comprising the steps of forming the enclosure at least partially of a steep sloped PTC material having a positive temperature coefficient greater than 30% per degree centigrade above an anomaly temperature, applying sufficient voltage to the PTC material in such a manner that current will flow through the material in a direction generally perpendicular to heat flow in the material, heating the material due to heat generated in the material, reaching an equilibrium condition where heat loss from the material equals the heat generated, thereby maintaining the enclosure at approximately a constant temperature regardless of changes in heat demand.

2. The method of providing a relatively constant temperature in an enclosure comprising the steps of forming the enclosure at least partially of a semi-conductive material having a resistivity, temperature curve characterized by a portion of the curve displaying a relatively level slope of a comparatively low resistance value, an anomaly point and a further portion displaying a positive temperature coefficient of resistance greater than 30% per degree centigrade, applying sufficient voltage to the material in such a manner that current will flow through the material in a direction generally perpendicular to heat flow in the material, heating the material due to heat generated in the material, reaching an equilibrium condition where heat loss from the material equals the heat generated, thereby maintaining the enclosure at approximately a constant temperature regardless of changes in heat demand.

3. A self-regulating component oven comprising:
   (a) a steep sloped PTC element composed of material having a positive temperature coefficient greater than 30% per degree centigrade above an anomaly temperature, the element having two ends and defining an enclosure therein;
   (b) means to apply voltage across the two ends whereby the resulting current will cause the element to heat up and an equilibrium will be reached so that the temperature of the surface defining the enclosure will be approximately constant and hence the temperature in the enclosure will be approximately constant regardless of changes in heat demand.

4. A self-regulating component oven according to claim 3 in which the PTC element is a hollow cylinder and the means to apply voltage across the ends includes an electrically conductive layer electrically connected to each end of the cylinder.

5. A self-regulating component oven according to claim 4 in which the PTC material is lanthanum doped barium titanate.

6. A self-regulating heating device comprising:
   (a) a steep-sloped PTC element having two ends and defining a cavity therein;
   (b) means to apply voltage across the two ends whereby the resulting current will cause the element to heat up and an equilibrium will be reached so that the temperature of the surface defining the cavity will be approximately constant and hence the temperature in the cavity will be approximately constant regardless of changes in heat demand, and the PTC element comprises a plurality of annular discs made of PTC material stacked one on top of the other to form a hollow cylinder, an electrically conductive layer electrically connected to each face of the discs and alternate discs being wired in parallel.

7. A self-regulating heating device according to claim 6 in which the PTC material is doped barium titanate.

8. A self-regulating heating device according to claim 7 in which the PTC material is doped with lanthanum.

9. An oven for maintaining a relatively constant ambient temperature for temperature sensitive devices regardless of changes in heat demand comprising:
   (a) a cylindrical PTC element having two ends and forming a cavity therein;

(b) electrically conductive layer attached to each end of the element;
(c) two disconnect pins;
(d) electrical leads connecting one layer to one pin and the other layer to the other pin;
(e) potting compound encasing the leads, part of each pin and all but one end of the PTC element;
(f) a base of electrical insulation material which supports the encased PTC element;
(g) means mounted in the base to receive and removably hold the pins;
(h) a socket mounted on the base for mounting a temperature sensitive device and adapted to be received within the cavity of the element;
(i) oven mounting means attached to the base and providing electrical connections for the socket and pins through pin holding means; and
(j) a cover enclosing the element and releasably attached to the base.

10. An oven according to claim 9 in which a cylindrical metal liner is placed into the element and is separated therefrom by electrical insulation.

11. An oven according to claim 9 in which the PTC material is doped barium titanate.

12. An oven according to claim 11 in which the PTC material is doped with lanthanum.

13. An oven for maintaining a relatively constant ambient temperature for temperature sensitive devices regardless of changes in heat demand comprising:
(a) a plurality of annular discs made of PTC material stacked one on top of the other to form a cylinder defining a cavity therein;
(b) an electrically conductive layer attached to each face of the discs;
(c) two disconnect pins;
(d) leads connecting the pins to the layers so that alternate discs are wired in parallel;
(e) potting compound encasing the leads, part of each pin and all but one end of the PTC element;
(f) a base of electrical insulation material which supports the encased PTC element;
(g) means mounted in the base to receive and removably hold the pins;
(h) a socket mounted on the base for mounting a temperature sensitive device and adapted to be received within the cavity of the element;
(i) oven mounting means attached to the base and providing electrical connections for the socket and pins through pin holding means; and
(j) a cover enclosing the element and releasably attached to the base.

14. An oven according to claim 13 in which a cylindrical metal liner is placed into the element and is separated therefrom by electrical insulation.

15. An oven according to claim 13 in which the material is doped barium titanate.

16. An oven according to claim 15 in which the material is doped with lanthanum.

17. A component oven comprising:
(a) a component support;
(b) a solid state heater element composed of material having a positive temperature coefficient greater than 30% per degree centigrade above an anomaly temperature mounted on said support and formed with an enclosure therein; and
(c) terminals electrically connected to said element in spaced relation to each other whereby voltage applied to said terminals will cause an electric current to pass through said element causing it to generate heat and approach a thermal equilibrium with heat loss while maintaining an essentially constant temperature.

18. A component oven according to claim 17 in which said element is annular in form and adapted to be in intimate thermal contact with a component mounted in said oven.

19. A component oven according to claim 17 in which said element is polygonal forming a plurality of axial faces and has an axial cavity for reception therein of a component and said terminals are electrically connected to alternate said faces.

20. A component oven according to claim 18 in which said element is split into a plurality of axial portions, and said terminals are electrically connected to two opposite longitudinal sides of each said portion.

21. A component oven according to claim 17 in which said element is composed of a plurality of PTC slabs arranged to define a cavity, and said terminals are electrically attached to two opposite faces of each said slab.

22. A component oven according to claim 3 in which the PTC element is $Ba_{.997}LaL_{.003}TiO_3$.

23. An oven according to claim 13 in which the PTC material is $Ba_{.997}La_{003}TiO_3$.

References Cited

UNITED STATES PATENTS

| | | | |
|---|---|---|---|
| 3,266,001 | 8/1966 | Landis et al. | 338—28 X |
| 1,757,895 | 5/1930 | Asch | 219—390 |
| 2,489,753 | 11/1949 | Cox | 13—22 X |
| 2,933,586 | 4/1960 | Schusterius | 219—505 X |
| 2,985,700 | 5/1961 | Johnston | 252—520 X |
| 3,038,056 | 6/1962 | Wolfskill | 219—210 |
| 3,142,814 | 7/1964 | Robinson | 252—520 X |
| 3,201,736 | 8/1965 | Onskinsky | 338—25 |
| 3,243,753 | 3/1966 | Kohler | 338—22 X |

RICHARD M. WOOD, *Primary Examiner.*

C. L. ALBRITTON, *Assistant Examiner.*